US008864225B2

(12) United States Patent
Nagasawa et al.

(10) Patent No.: US 8,864,225 B2
(45) Date of Patent: Oct. 21, 2014

(54) STRUCTURE OF CONTAINER MOUNTED TO VEHICLE SEAT AND METHOD FOR MOUNTING CONTAINER TO VEHICLE SEAT

(75) Inventors: Takahiko Nagasawa, Tokyo (JP); Takashi Inoue, Tokyo (JP); Atsushi Ishii, Tokyo (JP); Naoyuki Makita, Tokyo (JP)

(73) Assignee: Tachi-S Co., Ltd. (JP)

( * ) Notice: Subject to any disclaimer, the term of this patent is extended or adjusted under 35 U.S.C. 154(b) by 300 days.

(21) Appl. No.: 13/405,485

(22) Filed: Feb. 27, 2012

(65) Prior Publication Data
US 2012/0200127 A1  Aug. 9, 2012

(30) Foreign Application Priority Data

Aug. 3, 2010  (JP) ................................. 2010-174148

(51) Int. Cl.
*A47C 7/62* (2006.01)
*B60N 3/10* (2006.01)
*B60R 7/04* (2006.01)

(52) U.S. Cl.
CPC ................ *B60R 7/043* (2013.01); *B60N 3/108* (2013.01)
USPC .................................. 297/188.01; 297/188.2

(58) Field of Classification Search
CPC ............ A47C 7/62; A47C 7/68; A01K 97/22; B60N 2/4686
USPC ............... 297/188.01, 188.2, 188.08, 188.09, 297/188.12, 188.13, 188.14, 188.19
See application file for complete search history.

(56) References Cited

U.S. PATENT DOCUMENTS

| | | | | |
|---|---|---|---|---|
| 4,792,184 A * | 12/1988 | Lindberg et al. | ......... | 297/188.16 |
| 4,818,017 A * | 4/1989 | Dykstra et al. | ........... | 297/188.16 |
| 4,890,883 A * | 1/1990 | Boerema et al. | ............. | 297/227 |
| 5,060,899 A * | 10/1991 | Lorence et al. | ............ | 248/311.2 |
| 5,195,711 A * | 3/1993 | Miller et al. | ............... | 248/311.2 |
| 5,259,579 A * | 11/1993 | Schneider | .................. | 248/311.2 |
| 5,297,767 A * | 3/1994 | Miller et al. | ............... | 248/311.2 |
| 5,505,516 A * | 4/1996 | Spykerman et al. | ....... | 248/311.2 |
| 5,797,655 A * | 8/1998 | Miles | ....................... | 297/411.23 |
| 6,361,105 B1* | 3/2002 | Turner et al. | .................... | 297/23 |
| 6,450,468 B1* | 9/2002 | Hamamoto | ................ | 248/311.2 |
| 7,008,013 B2* | 3/2006 | Okamoto | .................. | 297/188.11 |
| 7,467,590 B1* | 12/2008 | Meller | ............................ | 108/90 |
| 8,042,780 B2* | 10/2011 | Wagner et al. | ............. | 248/311.2 |
| 2003/0116998 A1* | 6/2003 | Harvey | ..................... | 297/188.08 |
| 2009/0309395 A1* | 12/2009 | Curcio | ..................... | 297/188.19 |

FOREIGN PATENT DOCUMENTS

JP        9-309370       12/1997
JP        2006-61536      3/2006

* cited by examiner

*Primary Examiner* — David R Dunn
*Assistant Examiner* — Alexander Harrison
(74) *Attorney, Agent, or Firm* — Ostrolenk Faber LLP

(57) ABSTRACT

Container for accommodating small article(s) comprises: a container body including flange portion wherein connecting slits are formed; and a container lid element including lateral wall region having projected connecting pieces. A trim cover assembly of the seat includes: a peripheral end area or margin defined in a container mounting hole formed in the trim cover assembly; and connecting slits formed in that margin. In assembly, the connecting pieces are inserted through those flanged portion, while simultaneously the margin of trim cover assembly is sandwiched between the flanged portion and lateral wall region. Those free ends are flattened to connecting slits, respectively, so that free ends of the connecting pieces project from the connect together all the container body, container lid element and trim cover assembly. Finally, the trim cover assembly is attached upon a foam padding, with the container body inserted in a recession of the foam padding.

6 Claims, 4 Drawing Sheets

STRUCTURE OF CONTAINER MOUNTED TO VEHICLE SEAT AND METHOD FOR MOUNTING CONTAINER TO VEHICLE SEAT

BACKGROUND OF THE INVENTION

1. Field of the Invention

The present invention relates to a container mounted to a vehicle seat, wherein the container is defined hereby to be a container or holder for receiving or accommodating at least one small article therein, such as a cup holder or a small article container (or a case for accommodating small articles therein). In particular, the invention is directed to a structure of such container mounted to the vehicle seat, and also directed to a method for mounting the container to the vehicle seat.

2. Description of Prior Art

A vehicle seat of the type wherein a relatively small-sized container is provided in an upper surface of the seat cushion thereof, such container being adapted for receiving or accommodating small articles therein and hence being known as "small article container" or "small article case", which allows drink bottles, chewing gums, pens, tissue papers and any other small articles to be received and stored therein is known. Of course, the container includes a cup holder widely used in the seat.

In this sort of vehicle seat, in most instances, a container or small article container, inclusive of cup holder, is formed from a synthetic resin material and secured in a recession defined in a predetermined local area of a foam padding which forms a seat cushion of the vehicle seat. The container itself may be formed from a cloth material in a bag-like shape, and such cloth container may be securely placed in the aforesaid recession defined in the seat-cushion foam padding. But, in that case, a relatively heavy and hard article, such as drink bottle, can not be supported in a stable manner, and for that reason, a relatively robust container of synthetic resin material is widely used in the seat of this kind in order to stably accommodate various kinds of small articles.

In general, the container is typically formed from polypropylene into a configuration having an opening defined on the upper side thereof and a flange defined integrally therewith so as to extend peripherally and outwardly of that opening. A whole configuration of the container, excepting the flange, substantially conforms to a whole shape of the afore-stated recession which is defined in a local area of foam padding in a seat cushion, for example. With regard to the seat cushion in this case, a trim cover assembly, which has a cut-out region defined in correspondence with the recession, overlies substantially a whole upper surface of the foam padding, such that end portions of the said cut-out region circumscribe the recession. In assembly, a whole portion of the container, excepting the flange thereof, is placed in the recession and thereby securely mounted to the seat cushion, while insuring that all the end portions of the cut-out region of trim cover assembly are sandwiched between the flange of the container and the upper surface of the foam padding.

The above-described arrangement of container, with the end portions of the trim cover assembly's cut-out region sandwiched between the container's flange and the foam padding, has a problem that, when the upper surface of the seat cushion is resiliently depressed or lowered due to an externally applied load, an opening or clearance is created between the flange of the container and the localized surface area of the trim cover assembly adjoining with that flange, because the trim cover assembly is stretched downwardly due to the depression of seat cushion to a level lower than the flange. As a consequence thereof, it is highly possible that a finger(s) of user may be inserted into or caught in the aforesaid opening or clearance, when the user puts a small article(s) (e.g. drink bottle, pen or tissue paper) in the container or takes it out therefrom. Hence, provision of a guard or other finger protective means between the flange and the afore-said localized surface area of trim cover assembly is required to prevent the above-described insertion of the user's finger(s).

One example of a solution to the foregoing problem is found in the Japanese Laid-Open Patent Publication No. 2006-61536, wherein, in the same manner as described above, a container having a flange is secured in a recession formed in a foam padding of seat cushion, with the end portions of trim cover assembly being sandwiched between the flange and the foam padding. This prior art however discloses a relatively hard localized region of the foam padding surrounding the recession, which is harder than the other region of the foam padding, and shows a process for fastening a bottom of the container by a securing pin to a frame embedded in the seat cushion, such that the flange of the container is pressed downwardly against the end portions of trim cover assembly as well as against such a relatively hard localized region of foam padding. Hence, the end portions of trim cover assembly are positively and firmly sandwiched between the flange and the relatively hard localized region of foam padding, and in particular, such relatively hard localized region of foam padding withstands a normal load applied from a user's weight and movement or the like and therefore serves to avoid creation of clearance between the flange and such end portions of trim cover assembly in normal use.

However, since the foam padding per se is resiliently deformable, even the relatively hard region thereof is inevitably depressed or deformed downwardly by a downward great load applied thereto and/or to an area of the foam padding surrounding the recession and the flange of container. In that case, it is highly possible that an opening or clearance will be created between the container's flange and the trim cover assembly's end portions, and therefore the user's finger(s) may be inserted into or caught in that opening or clearance. Consequently, it is impossible with this prior art to completely solve such problem, and there is no other practical choice but to use and dispose a guard element around the flange of container as well as between the trim cover assembly's end portions and that flange in order to prevent the insertion of a user's finger(s).

As another example of prior art, there is a Japanese Laid-Open Patent Publication No. 9-309370 which also shows a container mounted on a seat, but discloses use of a wire between a flange of the container and a foam padding of the seat. Similarly to the foregoing descriptions, the container, excepting its flange, is placed in a recession formed in the foam padding and a trim cover assembly overlaying the foam padding has a cut-out region defined therein which substantially conforms to the contour of an opening of the container. But, according to this prior art, such cut-out region of the trim cover assembly is formed with a plurality of spaced-apart tubular end parts, and wires pass through those tubular end parts, so that the wires are partly exposed along the cut-out region of the trim cover assembly. Thus, those partly exposed portions of the wires are arranged around the recession of foam padding. The container's flange has a plurality of bifurcated latch pieces integrally formed in the lower side thereof. By engaging the bifurcated latch pieces with the partly exposed wires, respectively, the flange of container is secured on the seat, whereby all the end portions of the trim cover assembly's cut-out region are neatly and directly connected to the flange. This arrangement eliminates the necessity for such end portions associated with the trim cover assembly to be sandwiched between the flange and the foam padding, thereby making the flange and the trim cover assembly independent from the deformable foam padding. In other words, even when the foam padding is resiliently depressed or deformed downwardly around the recession in which the container is secured, no influence of such deformation of foam padding is imparted to both of the container and trim cover assembly, and therefore any opening or clearance is not created between the container and trim cover assembly. In addition, by simply engaging the latch pieces with the wire, the container can be easily and readily secured to an upper surface of seat cushion or the like.

However, with this prior art, it is extremely difficult and time-consuming to form the plurality of spaced-apart tubular portions in the ends of the trim cover assembly's cut-out region and insert the wires through the tubular portions, respectively.

SUMMARY OF THE INVENTION

In view of the above-stated drawbacks, it is a first purpose of the present invention to provide an improved structure of the above-described type of container mounted to a vehicle seat, such improved structure being effective in not only avoiding creation of clearance or opening between a flange of the container and a localized area of a trim cover assembly adjoining with that flange, but also providing a simplified structure that allows a rapid mounting of the container to the vehicle seat.

In order to achieve such purpose, in accordance with the present invention, there is basically provided a structure of container of this kind mounted to a vehicle seat, wherein the vehicle seat includes: an upper surface; a foam padding having an upper surface defined therein in correspondence with the upper surface of the vehicle seat and a recession formed in the upper surface thereof; and a trim cover assembly covering the foam padding, the trim cover assembly including an upper cover section adapted to cover the upper surface of the foam padding, wherein the container comprises:

a container body having: a main body portion; a flange portion defined integral with the main body portion so as to extend outwardly and peripherally of the main body portion, the flange portion having a normal surface and a reverse surface opposite to the normal surface; and a plurality of connecting slits formed in and along the flange portion;

a container lid element including; a top wall region; an openable lid region defined in the top wall region; and a lateral wall region extending vertically from and peripherally of the top wall region and terminating in an end extending along the lateral wall region;

the lateral wall region having: an outer surface defined outwardly of the container lid element; and an inward surface defined inwardly of the container lid element; and a flat surface defined in the end of the lateral wall region so as to lie between the outer surface of the lateral wall region and a predetermined point in the end of the lateral wall region and extend along the end; and a plurality of connecting pieces formed in and along the end of the lateral wall region in correspondence with the plurality of connecting slits, respectively, so as to project from the end and lie between the predetermined point in the end and the inward surface of the lateral wall region, the plurality of connecting pieces therefore projecting from the end in an offset manner with reference to the outer surface of the lateral wall region, with the flat surface being situated between the plurality of connecting pieces and the outer surface of the lateral wall region, in the end, wherein the upper cover section includes: a container mounting hole formed therein; and a peripheral end area defined about the container mounting hole, wherein a plurality of connecting slits are formed in and along the peripheral end area so as to surround the container mounting hole, the plurality of connecting slits being disposed in correspondence with the plurality of connecting pieces, respectively, wherein the lateral wall region of the container lid element is juxtaposed upon the normal surface of the flange portion of the container body, wherein the peripheral end area associated with the upper cover section is sandwiched between the normal surface of the flange portion and the flat surface of the lateral wall region of the container lid element, wherein the plurality of connecting pieces of the container lid element pass through the plurality of connecting slits associated with the upper cover section, respectively, and also pass through the plurality of connecting slits formed in the flange portion of the container body, respectively, whereupon the plurality of connecting pieces project from the reverse surface of the flange portion, wherein each of the plurality of connecting pieces has a flattened stopper portion formed at the free end thereof by welding or fusing, the flattened stopper portion being in close contact with the reverse surface of the flange portion, thereby preventing removal of the container lid element from the container body, and wherein the trim cover assembly is securely attached to the foam padding, such that the upper cover section thereof covers the upper surface of the foam padding, with the main body portion of the container body inserted in the recession of the foam padding.

As one aspect of the present invention, the flange portion may be formed with a vertically protrudent end protion integrally therewith so as to extend vertically from and peripherally of the flange portion. Thus, the lateral wall region of the container lid element be surrounded by the vertically protrudent end portion, with the peripheral end area associated with the upper cover section beubg sandwiched between the lateral wall region and the vertically protrudent end portion as well as between the normal surface of the flange portion and the flat surface of the lateral wall region of the container lid element, As another aspect of the invention, the top wall portion of the container lid element may be formed to have: an outer surface facing outwardly thereof; and a reverse surface opposite to the outer surface, the reverse surface facing to the container body. The main body portion of the container body may comprise: a substantially annular lateral wall portion with which the flange portion is formed integrally so as to extend outwardly and peripherally thereof; and an end portion defined integrally in the substantially annular lateral wall portion, such that the end portion extends vertically form a point in the substantially annular lateral wall portion where the flange portion lies, and terminates at a level where the end portion is situated adjacent to or contacted with the reverse surface of the top wall portion of the container lid element.

It is a second purpose of the present invention to provide a method for mounting the afore-the container to the vehicle seat, which allows rapid mounting of the container to the vehicle seat in a simplified manner.

For that purpose, in accordance with the present invention, there is basically provided a method for mounting a container to an upper surface of a vehicle seat, wherein the container is adapted to receive or accommodate at least one small article therein, and comprises: (a) a container body having: a main body portion; a flange portion extending outwardly and peripherally of the main body portion, the flange portion having a normal surface and a reverse surface opposite to the normal surface; and a plurality of connecting slits formed in and along the flange portion; and (b) a container lid element including; a top wall region; and a lateral wall region extending vertically from and peripherally of the top wall region and terminating in an end extending along the lateral wall region; the lateral wall region having: an outer surface defined outwardly of the container lid element; and an inward surface defined inwardly of the container lid element; and a flat surface defined in the end of the lateral wall region so as to lie between the outer surface of the lateral wall region and a predetermined point in the end of the lateral wall region and extend along the end; and a plurality of connecting pieces formed in and along the end of the lateral wall region in correspondence with the plurality of connecting slits, respectively, so as to project from the end and lie between the predetermined point in the end and the inward surface of the lateral wall region, the plurality of connecting pieces therefore projecting from the end in an offset manner with reference to the outer surface of the lateral wall region, with the flat surface being situated between the plurality of connecting pieces and the outer surface of the lateral wall region, in the end, the method comprising the steps of:
providing a foam padding which includes: an upper surface defined therein in correspondence with the upper surface of the vehicle seat; and a recession formed in the upper surface thereof,
providing a trim cover assembly for covering the foam padding, the trim cover assembly including an upper cover section adapted to cover the upper surface of the foam padding, wherein the upper cover section includes: a container mounting hole formed therein; a peripheral end area defined about the container mounting hole; and a plurality of connecting slits formed in and along the peripheral end area so as to surround the container mounting hole, the plurality of connecting slits being disposed in correspondence with the plurality of connecting pieces, respectively,
placing the upper cover section upon the container lid element, while causing the plurality of connecting pieces to pass respectively through the plurality of connecting slits associated with the upper cover section,
attaching the container lid element with the upper cover section thus placed thereon to the container body, while causing the plurality of connecting pieces to pass respectively through the plurality of connecting slits associated with the container body and bringing both of the lateral wall region and flat surface of the container lid element into contact with the normal surface of the flange portion of the container body, so that the peripheral end area associated with the upper cover section is sandwiched between the normal surface of the flange portion and the flat surface of the lateral wall region of the container lid element, while free ends respectively of the plurality of connecting pieces project outwardly from the reverse surface of the flange portion,
melting or fusing each of the free ends respectively of the plurality of connecting pieces to thereby form a flattened stopper portion therein such that the flattened stopper portion is in close contact with the reverse surface of the flange portion, thereby preventing removal of the container lid element from the container body, whereupon a resultant assembled state of the container is securely mounted to the upper cover section in place, and
thereafter, attaching the upper cover section, to which the resultant container has been thus mounted, upon the upper surface of the foam padding, while simultaneously inserting the main body portion of the resultant container in the recession of the foam padding.

Other various features of the present invention will become apparent from reading of the description, hereinafter, with reference to the accompanied drawings.

DETAILED DESCRIPTION OF PREFERRED

Embodiment of the Invention

Figure 1:
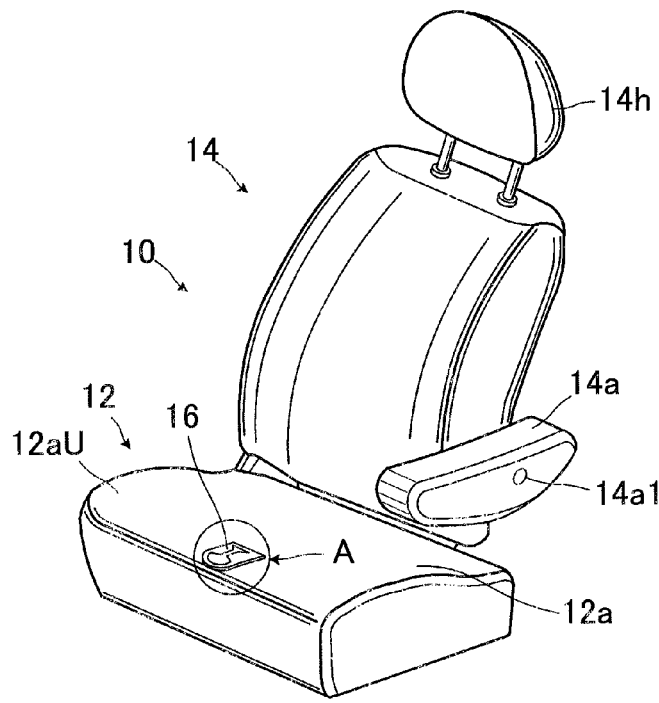
FIG. 1 is a perspective view of a vehicle seat with a container mounted thereon in accordance with the present invention.
Figure 2:
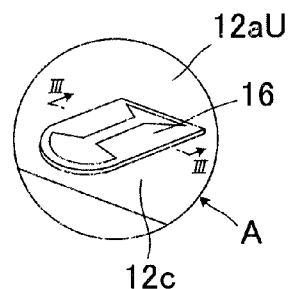
FIG. 2 is an enlarged view taken from a circle portion "A" in FIG. 1.
Figure 3:
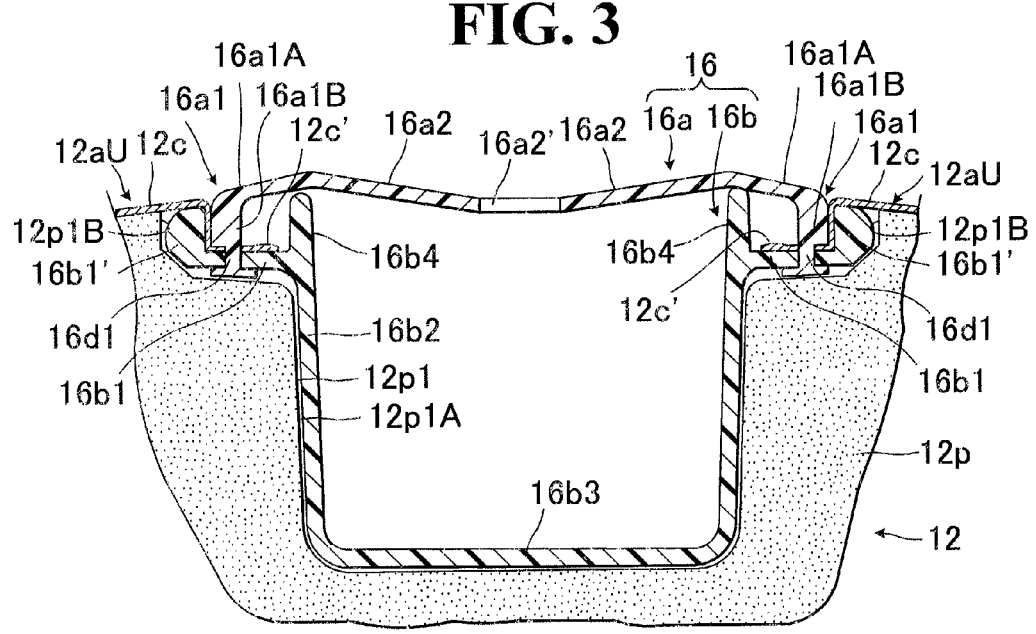
FIG. 3 is a sectional view taken along the line III-III in FIG. 2.
Figure 4:
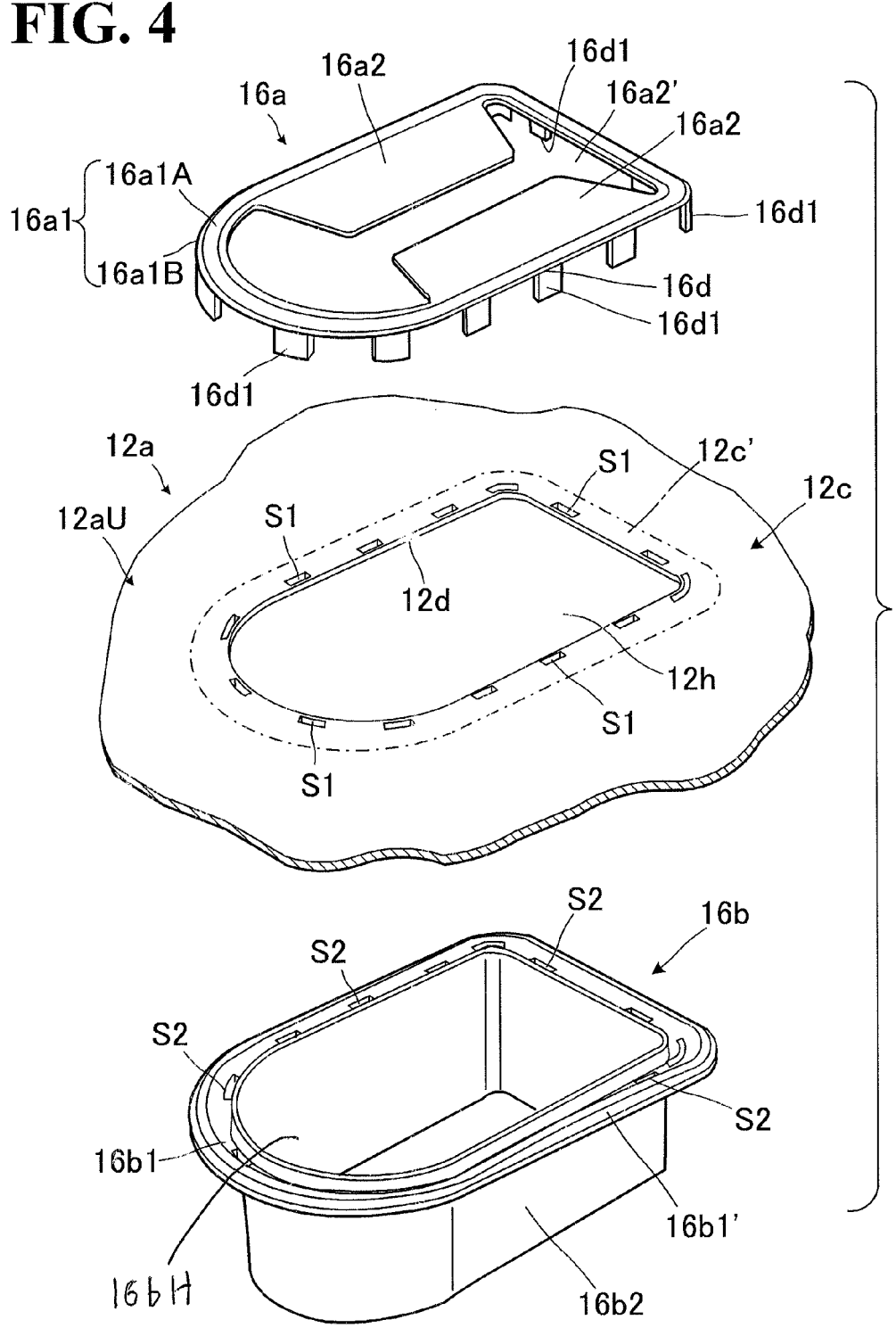
FIG. 4 is a partly broken exploded perspective view of a principal part of the present invention.

Referring to the annexed drawings, one preferred mode of the present invention will be described in detail. Shown in perspective in FIG. 1 is a vehicle seat (10) including a seat cushion (12), wherein it is observed that a container (16) forming one element of the present invention is mounted in a forwardly facing end area of an upper surface or seating surface of the seat cushion (12). FIG. 2 is an enlarged illustration of a localized area of the seat cushion (12) at which the container (16) is provided. FIG. 3 illustrates a longitudinal section of such localized area of seat cushion as well as of the container, and FIG. 4 is an exploded perspective view showing a construction of the container (16) and a trim cover assembly (12a) in accordance with the present invention, wherein the trim cover assembly (12a) is formed from an air-permeable material or the like, as known in the art.

The vehicle seat (10) further comprises a seat back (14) on which a headrest (14h) is mounted, and an armrest (14a)

provided to one lateral side of the seat back (14), the armrest (14a) being rotatable vertically about a support pin (14a1).

The container (16) itself, similarly to the previously described kind of container, is adapted for receiving and accommodating therein at least one small article, such as a cup, a drink bottle, chewing gum, a pen or tissue paper. But, as seen in FIGS. 3 and 4, the container (16) in accordance with the present invention comprises: a container body (16b); and a container lid element (16a) which is to be assembled with the container body (16b), via an upper cover section (12aU) of the trim cover assembly (12a), as will be elaborated later.

As shown, the container body (16b) has a flange portion (16b1) defined integrally therewith so as to extend peripherally and outwardly thereof. The container lid element (16a) includes: a pair of spaced-apart resilient lid portions (16a2) and (16a2); and an opened region (16a2') defined by cutting away a predetermined area of the container lid element (16a), while forming the two resilient lid portions (16a2) therein at the same time. The two resilient lid portions (16a2) are each resiliently movable vertically relative to the container lid element (16a). Therefore, in a resultant assembled container (16), a user can simply bend down and open those two lid portions (16a2) resiliently to put the above-stated small article(s) in the container body (16b) though the opened region (16a2'), or can simply bend up and open the lid portions (16a2) resiliently to take out the small article(s) from the container body (16b) through the opened region (16a2'). The two lid portions (16a2) thus bent either downwardly or upwardly, upon being released, will automatically return to a normal horizontal position due to the resilient property thereof, wherein the normal horizontal position is a position where both two lid portions (16a2) (16a2) normally extend horizontally towards each other, as can be seen in FIGS. 3 and 4.

The seat cushion (12) is depicted in FIG. 3 to comprise a foam padding (12p) and the afore-said trim cover assembly (12a) covering substantially a whole outer surface of the foam padding (12p). The trim cover assembly (12a) has an upper cover section (12aU) (i.e. seating cover surface area) that covers an entire upper surface of the foam padding (12p), excepting a recession (12p1) formed in that foam padding. In the shown embodiment, the recession (12p1) is defined in the upper surface of the foam padding (12p) at a point corresponding to the forwardly facing end area of an upper surface of the seat cushion (12) (see FIG. 1).

As is understandable from FIG. 3, the recession (12p1) is so formed to define: a first recession area (12p1A) so configured as to accommodate a whole of the container body (16b) of the afore-said container (16); and a second recession area (12p1B) formed shallow so as to extend radially from and peripherally of the opened upper region of the first recession area (12p1A). The second recession area (12p1B) is so configured as to receive a whole of the aforementioned flange portion (16b1) therein.

A more specific description will be made as to the structure of the container (16), with particular reference to FIGS. 3 and 4.

The container (16) itself, including both container body (16b) and container lid element (16a), is preferably formed from a synthetic resin material, as indicated by the hatching in the Figures, wherein the synthetic resin material is of a soft and elastic property. Of course, an elastomer or other suited material having soft and elastic property may be used, insofar as it may serve as the intended material of the container (16).

As shown in FIG. 4, the container body (16b) is composed of: a vertical body wall portion (16b2) that substantially assumes a circular or rectangular wall configuration in cross-section and has an opened side (16bH) defined in the upper end thereof; a bottom wall portion (16b3); the flange portion (16b1) described earlier; and an upper end portion (16b4) circumscribing the opened side (16bH). Note that both vertical body wall portion(16b2) and bottom wall portion (16b3) constitute a main body portion of the container body (16b). The flange portion (16b1) per se extends horizontally and outwardly from the vertical wall portion (16b2) and terminates in a vertically protrudent end portion (16b1') which projects vertically (at a right angle) from the flange portion (16b1). It is noted here that a total horizontal length of both flange portion (16b1) and vertically protrudent end portion (16b1) and a height of the vertical protrudent end portion (16b1') are substantially identical to the breadth and depth of the second recession area (12p1B), respectively. With this construction, an entirety of the flange and vertically protrudent end portions (16b1) (16b1') can be accommodated in the second recession area (12p1B) so as not to project above the outer surface of the foam padding (12p). This can be observed from FIG. 3.

In accordance with the present invention, formed in the flange portion (16b1) of the container body (16b) are a plurality of connecting slits (S2) in which, as described later, a plurality of connecting pieces (16d1) of the container lid element (16a) are to be inserted and secured, respectively. In the shown embodiment, the connecting slits (S2) each assumes a rectangular shape, and all those connecting slits (S2) are defined in an equidistant fashion in and along the flange portion (16b1)

The upper end portion (16b4) extends upwardly from a point in the vertical wall portion (16b2) where the flange portion (16d1) lies, and terminates at a level where the inward surface of the container lid element (16a) is to be positioned, when assembling together the container lid element (16a) with the container body (16b), which will be more specifically described later.

As best seen in FIG. 4, the container lid member (16a) is comprised of: a main body portion (16a1); a pair of resilient lid portions (16a2) and (16a2); a plurality of connecting pieces (16d1) projecting vertically or downwardly from the body portion (16a1); and an opened region (16a2'). The opened region (16a2') is defined among the main body portion (16a1) and the two lid portions (16a2), and therefore the main body portion (16a1) assumes a substantially annular configuration, as far as the present embodiment is concerned.

Specifically, the afore-said main body portion (16a1) is so formed to have: a top wall region (16a1A) which substantially extends on a horizontal plane; and a lateral wall region (16a1B) extending vertically and continuously from that top wall region (16a1A).

Figure 5:
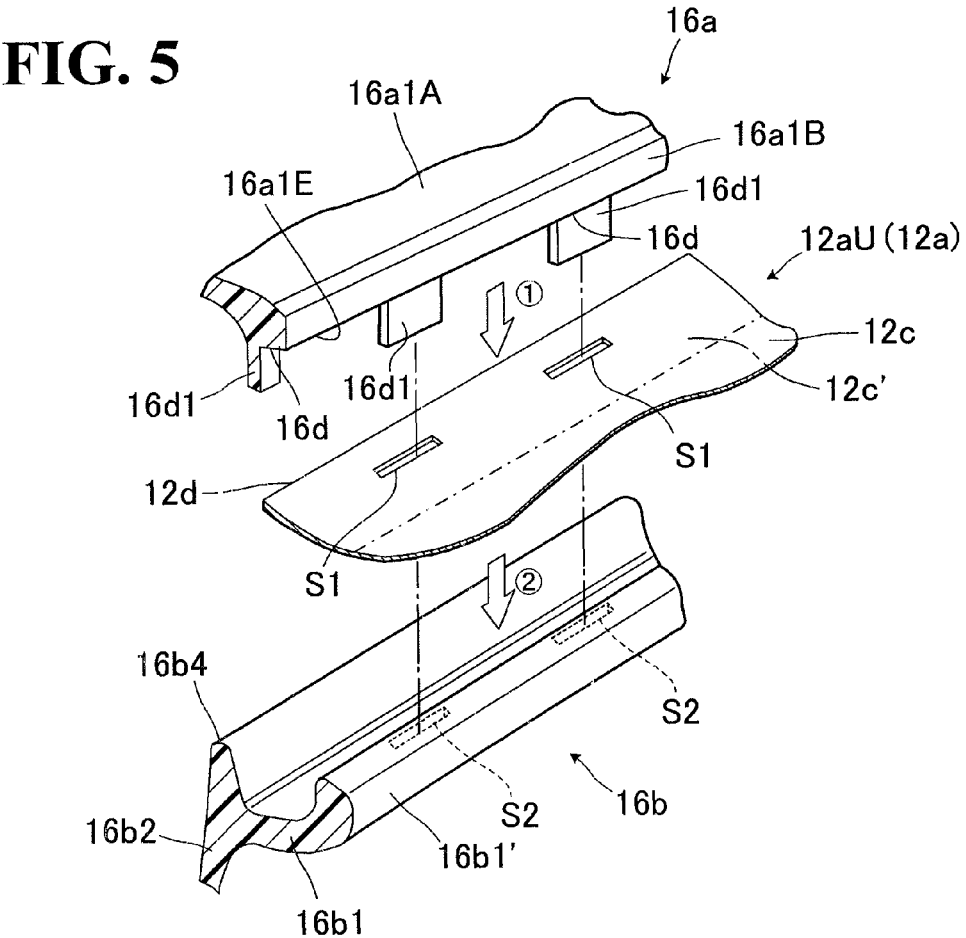
FIG. 5 is a partly broken diagram for explanatorily showing the steps of assembling the container together with an upper cover section of trim cover assembly.

As best shown in FIG. 5, in accordance with the present invention, defined in and along the lower end of the afore-said lateral wall region (16a1B) are: a flat surface (16d); and the plurality of connecting pieces (16d1) which are to be inserted in the previously stated connecting slits (S2), respectively. In this regard, it can be seen from FIG. 7 that the flat surface (16d) is defined in the lower end of the lateral wall region (16a1B) so as to lie between the outer surface of that particular lateral wall region (16a1B) and a predetermined point, whereas the connecting pieces (16d1) are defined in the lower end of the lateral wall region (16a1B) so as to lie between the inward surface of the lateral wall region (16a1B) and the afore-said predetermined point. Therefore, as shown, the connecting pieces (16d1) project from the lower end of the lateral wall region (16a1B) in an offset manner with reference to the outer surface of the lateral wall region (16a1B). It is therefore to be seen that the flat surface (16d) is situated between each of the connecting pieces (16*d*1) and the outer surface of the lateral wall region (16*a*1B), while extending in and along a whole of the lower end of the lateral wall region (16*a*1B).

Similarly to the connecting slits (S2), the connecting pieces (16*d*1) are each of a rectangular shape in cross-section, which is slightly smaller than each of the connecting slits (S2). As will be described, in assembly, the connecting pieces (16*d*1) are each molten or fused at the distal end portion thereof in order to connect the container lid element (16*a*) integrally with the container body (16*b*) via the trim cover assembly. Therefore, it is important that the container lid element (16*a*) as well as the connecting pieces (16*d*1) should be formed from a fusible or thermally meltable synthetic resin material or an elastomer having a fusible property, for instance.

Figure 7:
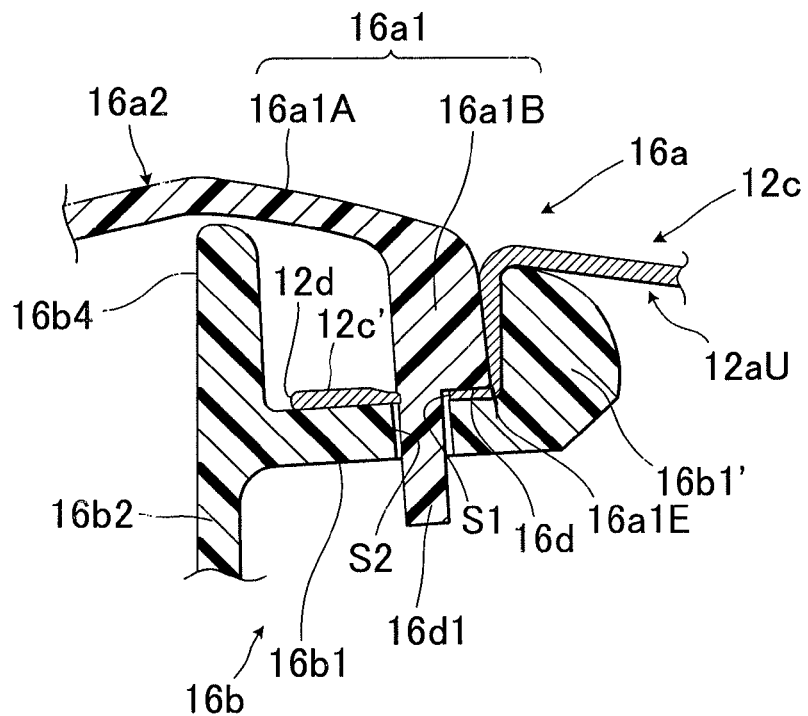
FIG. 7 is a sectional view taken along the VII-VII in FIG. 6.

As shown, the flat surface (16*d*) is situated outwardly of the body portion (16*a*1), whereas the connecting pieces (16*d*1) are situated inwardly of the body portion (16*a*1) and disposed in an equidistant fashion. As best shown in FIG. 7, more specifically, the foregoing lateral wall region (16*a*1B) is formed such that: (i) the entire outer surface thereof extends downwardly from the upper wall region (16*a*1A), while becoming divergent outwardly as it proceeds down to an acutely tapered end portion (16*a*1E), hence providing a sloped surface; and (ii) the flat surface (16*d*) extends horizontally between such acutely tapered end portion (16*a*1E) and each of the connecting pieces (16*d*1).

In this context, it is to be noted that the flange portion (16*b*1) per se is situated between the upper end portion (16*b*4) and the vertically protruded end portion (16*b*1'), and those flange portion (16*b*1), upper end portion (16*b*4) and vertically protrudent end portion (16*b*1') cooperate to define an annularly extending groove or space in that flange portion (16*b*1), as is understandable from FIGS. 4 and 7. Thus, when assembling the container lid element (16*a*) and container body (16*b*) together, substantially a whole of the lateral wall region (16*a*1B) of the container lid element (16*a*) is received in such annularly extending space at the flange portion (16*b*1), as seen in FIG. 7, while the connecting pieces (16*d*1) are respectively engaged in the connecting slits (S2). With this assembly in view, an outer diameter of the lateral wall region (16*a*1B) that annularly extends along the container lid element's body portion (16*a*1) is slightly smaller than the inner diameter of the vertically protrudent end portion (16*b*1') that annularly extends along the container body's flange portion (16*b*1). But, during the assembly, a peripheral end region or margin (12*c*') of a container mounting hole (12*h*), which will be specified below, must be sandwiched between those body and flange portions (16*a*1) and (16*b*1). It is therefore important that a proper clearance should be provided between the container lid element's lateral wall region (16*a*1B) and the container body's vertically protrudent end portion (16*b*1'), to the extent of allowing the peripheral end region or margin (12*c*') to be interposed or sandwiched therebetween as well as between the flat surface (16*d*) and the upper surface of the flange portion (16*b*1), as can be seen from FIG. 7 in conjunction with FIG. 3.

Reference is now made to FIG. 4 which clearly shows a container mounting area defined in the upper cover section (12*a*U) of the trim cover assembly (12*a*), the container mounting area being an area to which the container (16) is securely mounted. Specifically, at such mounting area in the upper cover section (12*a*U), a container mounting hole (12*h*) is formed, which is shown to have a shape substantially conforming to the outer contour of the container body (16*b*). In particular, the container mounting hole (12*h*) is slightly larger than the outer contour of container body (16*b*) so as to permit the container body (16*b*) to pass therethrough and be positioned therein, during assembly to be set forth later. The container mounting hole (12*h*) also substantially conforms to the contour of the afore-said opened side (16*b*H) of the container body (16*b*), but has a diameter lager than the diameter of that opened side (16*b*H). Designation (12*d*) denotes an edge of the container mounting hole (12*h*). Designation (12*c*') denotes a predetermined peripheral end area or margin, as stated earlier, which is defined around the container mounting hole (12*h*) with reference to the edge (12*d*) of that particular container mounting hole (12*h*). Such peripheral end area or margin (12*c*') is an area to be sandwiched between the container lid element (16*a*) and the container's flange portion (16*b*1), as will be stated more specifically later.

Further, as shown in the FIG. 4, a plurality of connecting slits (S1) are formed in and along the afore-said peripheral end area or margin (12*c*') so as to be arrayed near to and along the edge (12*d*) of the container mounting hole (12*h*). It is to be noted that such connecting slits (S1) are disposed in correspondence with the plurality of connecting pieces (16*d*1) of the container lid member (16*a*), respectively. Also, each of the connecting slits (S1) is slightly larger than each of the connecting pieces (16*d*1), so that the connecting pieces (16*d*1) can be inserted through the respective connecting slits (S1) during assembly.

Now, a description will be made of steps for assembling the container (16), while simultaneously mounting the container to the upper cover section (12*a*U) of the trim cover assembly (12*a*).

At first, as indicated by the arrow ① and one-dot chain lines in FIG. 5, the connecting pieces (16*d*1) of the container lid element (16*a*) are inserted through and engaged in the connecting slits (S1) formed in the peripheral end area or margin (12*c*'), respectively. At this stage, due to such engagement of the connecting pieces (16*d*1) in the respective connecting slits (S1), a whole of the peripheral end area or margin (12*c*') surrounding the container mounting hole (12*h*) is in contact with a whole of the flat surface (16*d*) of the container lid element (16*a*), while the container mounting hole (12*h*) is situated inwardly of the container lid element (16*a*). Hence, the container lid element (16*a*) is accompanied by the upper cover section (12*a*U) of the trim cover assembly (12*a*).

Figure 6:
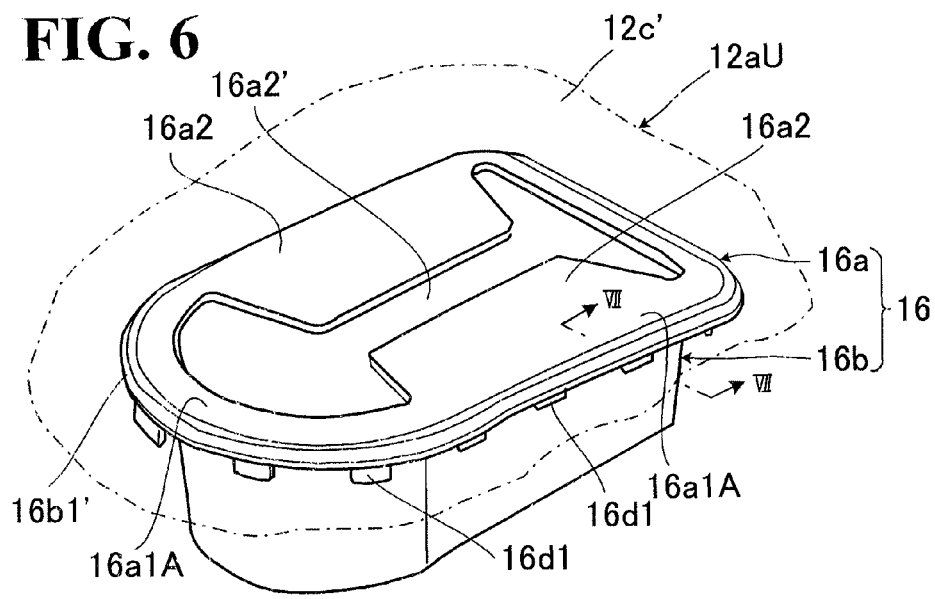
FIG. 6 is a schematic perspective view indicating a resultant container assembled with the upper cover section.

Then, the connecting pieces (16*d*1), with the peripheral end area or margin (12*c*') of trim cover assembly attached thereto, are further inserted through the connecting slits (S2) of the container body (16*b*), respectively, as indicated by the arrow ② and one-dot chain lines in FIG. 5. During this process, the lateral wall region (16*a*1B) of the container lid element (16*a*) is placed upon the flange portion (16*b*1) of container body (16*b*), while all the connecting pieces (16*d*1) pass through the two connecting slits (S1) and (S2), respectively, and project from the reverse or lower surface of the flange portion (16*b*1), as seen in FIGS. 6 and 7. Simultaneous therewith, the peripheral end area or margin (12*c*') is forcibly pulled by all the lateral wall region (16*a*1B), flat surface (16*d*) and connecting pieces (16*d*1) down to the flange portion (16*b*1) relative to the vertically protrudent end portion (16*b*1'). As a result thereof, as shown in FIG. 7, the peripheral end area or margin (12*c*') defined about the container mounting hole (12*h*) is sandwiched between the outer sloped surface of the lateral wall region (16*a*1B) and the vertical inward surface of the vertically protrudent end portion (16*b*1') and also sandwiched between the flat surface (16*d*) and the normal or upper surface of the flange portion (16*b*1). In this respect, it is noted that the sloped outer surface of lateral wall region (16*a*1B) and the flat surface (16*d*) cooperate to define an acutely tapered end (16*a*1E) therebetween. Therefore, at the present stage, it is to be appreciated that, with downward movement of the lateral wall region (16a1B) to the flange portion (16b1), such acutely tapered end (16a1E) is also simultaneously moved down to the flange portion (16b1), causing the peripheral end area or margin (12c') to neatly and positively press against the vertical inward surface of the vertically protrudent end portion (16b1'). In addition thereto, upon the container lid element's body portion (16a1) reaching the flange portion (16b1), an entirety of the acutely tapered end (16a1E) is mated with and along an entirety of the right-angled corner between the upper surface of the flange portion (16b1) and the inward surface of vertically protrudent end portion (16b1'), as can be seen in FIG. 7, whereupon the peripheral end area or margin (12c') is positively and neatly retained in and along an entirety of the afore-said right-angled corner against movement. Also, provision of the acutely tapered end (16a1E) is effective in allowing the peripheral end area or margin (12c') to be smoothly and quickly sandwiched between the lateral wall region (16a1B) and the vertically protrudent end portion (16b1') as well as between the flat surface (16d) and the flange portion (16b1). Those advantageous effects can readily be understood by a person skilled in the art who looks at FIGS. 5 to 7. For, such effects are not attainable in the case where the outer surface of the lateral wall region (16a1B) is formed vertical to provide a vertical surface parallel with the vertical inward surface of the vertically protrudent end portion (16b1'). This is because, in that case, an area of contact between such vertical outer surface of lateral wall region (16a1B) and the peripheral end area or margin (12c') increases so greatly that a coefficient of friction becomes extremely high therebetween. By contrast, the afore-said acutely tapered end (16a1E) provides nearly a point contact to the peripheral end area or margin (12c'), thus achieving an extremely low coefficient of friction therebetween.

During the above-described assembly, it is also to be seen that, while assembling the container lid element (16a) with the container body (16b), a whole of the peripheral end area or margin (12c') associated with the trim cover assembly (12a) is simultaneously pulled and forced down into a predetermined clearance provided between the container lid element's lateral wall region (16a1B) and the container body's flange portion (16b1), and then neatly sandwiched between the lateral wall region (16a1B) and the flange portion (16b1). At this moment, a whole of the edge (12d) of the container mounting hole (12h) is situated within a space defined among the lateral wall region (16a1B), flange portion (16b1) and upper end portion (16b4), thereby being completely concealed from the outside, as is understandable from FIG. 7 in conjunction with FIGS. 4 to 6.

Figure 8:
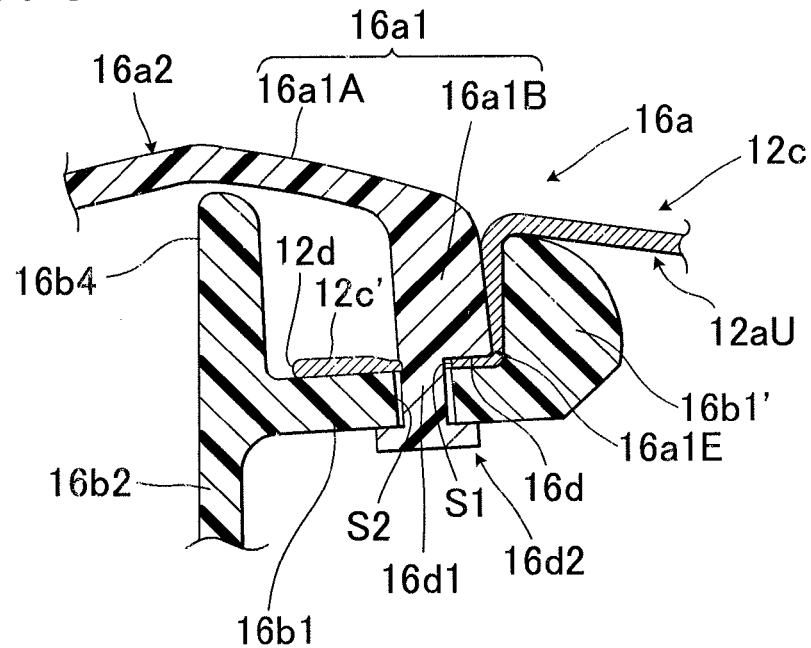
FIG. 8 is a sectional view similar to the FIG. 7, which indicates a state where connecting pieces of the container are each molten or fused to form a flattened stopper portion therein.

At the present step, as is understandable from FIGS. 6 and 7, all of the connecting pieces (16d1) project outwardly from the reverse or lower surface of the flange portion (16b1). Then, as shown in FIG. 8, each free end portion of the thus-projecting connecting pieces (16d1) is melted or fused to form a flattened stopper portion (16d2) thereat, which prevents removal of the container lid element (16a) from the container body (16b), so that the assembled container (16) is firmly mounted in the upper cover section (12aU), with the peripheral end area or margin (12c') retained and concealed between the container lid element (16a) and the container body (16b). Accordingly, there is obtained a finished trim cover assembly (12a) or finished upper cover section (12aU) with the container (16) securely mounted therein, as can be seen from FIGS. 6 and 7.

Thereafter, as is understandable from FIG. 3, the thus-finished upper cover section (12aU) is placed upon the upper surface of the foam padding (12p), while insuring that the body portion (16b) of the assembled container (16) is inserted in the first recession (12p1A) and also insuring that the flange and protrudent end portions (16b1) (16b1') of the assembled container (16) are both received in the second recession (12p1B).

Finally, while not shown, the peripheral terminal ends of the trim cover assembly (12a) are pulled down and secured to the bottom side of the foam padding (12p), so that a whole of the upper cover section (12aU) is stretched over and closely contacted upon the entire corresponding upper surface of the foam padding (12p), and the container main body portion (at 16b2 and 16b3) is retained in the first recession (12p1A), while both flange and protrudent end portions (16b1) (16b1') are retained in the second recession (12p1B), as shown in FIG. 3. Accordingly, as illustrated in FIG. 1, there is produced a resultant seat cushion (12) having the container (16) mounted thereon.

However, in practical assembly, all the elements shown in FIGS. 4 to 7 are inverted or turned upside down, and undergo steps of assembly in a manner different from the above-described steps. Hence, based on such inverted conditions, one example of practical assembly of the seat cushion will be specifically described below:

(a) First, by looking at FIG. 4 in an upside-down manner, let us mention that the container lid element (16a) is turned upside down, with the connecting pieces (16d1) thereof projecting upwardly, and the thus-inverted container lid element (16a) is placed upon a jig or positioning support member (not shown), thereby being set at a predetermined position.

(b) Second, by looking at FIG. 5 in an upside-down manner, let us mention that the trim cover assembly (12a), or strictly stated, the upper cover section (12aU) thereof is turned upside down, with the reverse surface thereof showing up. Under such reversed state, the upper cover section (12aU) is brought down to the afore-said container lid element (16a) that has been set on the jig upside down, while insuring that all the connecting pieces (16d1) of the container lid element (16a) are respectively inserted through and engaged in all the connecting slits (S1) formed around the container mounting hole (12h) in the upper cover section (12aU). Thus, at this point, it is to be understood that the upper cover section (12aU) overlies the container lid element (16a) which is in turn attached in place at the container mounting hole (12h) of the upper cover section (12aU), while the connecting pieces (16d1) of the container lid element (16a) project upwards from the reverse surface of the upper cover section (12aU).

(c) Next, by looking at FIGS. 4 and 5 in an upside-down manner, let us mention that the container body (16b) is turned upside down, so that the bottom wall (16b3) thereof is turned upward, with the upper side of flange portion (16b1) thereof facing downwardly, and that, under such inverted state, the container body (16b) is brought down to the upper cover section (12aU) that overlies the container lid element (16a), in a direction to a target point where the connecting pieces (16d1) project upwardly, which is indicative of the location of the container mounting hole (12h). At this stage, while bringing the container body (16b) down to the upper cover section (12aU), all the upwardly projected connecting pieces (16d1) on the side of the upper cover section (12aU) are respectively inserted through and engaged in all the connecting slits (S2) of the container body (16b) which are being concurrently moved down, and at the same time, the vertically protrudent end portion (16b1') is moved downwardly relative to and along the outer surface of the container lid element's lateral wall region (16a1B) that underlies the peripheral end area or margin (12c'), whereby the peripheral end area or margin (12c') is forced into a predetermined clearance provided between the inward surface of the vertically protrudent end portion (16b1') and the outer surface of the lateral wall region (16a1B) and eventually sandwiched therebetween as well as between the flange portion (16b1) and the flat surface (16d). Those steps can be understood by looking at FIG. 7 upside down. As a result thereof, a whole of the flange portion (16b1) of the container body (16b) is brought to contact with a whole of flat surface (16d) of the container lid element (16a), whereupon an entirety of the peripheral end area or margin (12c') associated with the upper cover section (12aU) is sandwiched between the lateral wall region (16a1B) and the flange portion (16b1) in the same manner as specified previously with reference to FIG. 7. Thus, at this point, it is to be understood that the container body (16b) is placed in an inverted state upon the reverse surface of the upper cover section (12aU) supported by the afore-said jig, such that all the connecting pieces (16d1) project upwardly from the reverse surface of the container body's flange portion (16b1)

(d) Thereafter, by looking at FIG. 8 in an upside-down manner, let us mention that a melting or fusing is effected, as by ironing, to each end portion of the upwardly projecting connecting pieces (16d1) so that a flattened portion (16d2) is formed therein, as a stopper, to thereby prevent removal of the container lid element (16a) from the container body (16b). Thus, the container (16) is firmly mounted in the reverse side of the upper cover section (12aU), with the peripheral end area or margin (12c') retained and concealed between the container lid element (16a) and the container body (16b). Accordingly, there is obtained a reversed state of finished upper cover section (12aU) on which the container (16) is mounted in an inverted state, which can be understood by looking at FIGS. 6 and 7 upside down.

(e) Next, the thus-finished upper cover section (12aU), which is still in a reversed state, with the assembled container (16) mounted thereon in an inverted state, is taken out from the jig. After then, both of the upper cover section (12aU) and container (16) are turned reversely, so that the upper surface of the upper cover section (12aU) shows up, and the container body (16b) of the container (16) is positioned under that upper cover section (12aU), while the container lid element (16a) of the container (16) is positioned on and above the upper cover section (12aU), as can be seen in FIG. 8. Then, in the same manner as described previously, the finished upper cover section (12aU) is placed upon the upper surface of the foam padding (12p), while insuring that the body portion (at 16b2 and 16b3) of the assembled container (16) is inserted in the first recession (12p1A) and also insuring that both flange and protrudent end portions (16b1) (16b1') of the assembled container (16) are received in the second recession (12p1B).

(f) Finally, the peripheral terminal ends of the trim cover assembly (12a) are pulled down and secured to the bottom side of the foam padding (12p), so that a whole of the upper cover section (12aU) is stretched over and closely contacts the entire corresponding upper surface of the foam padding (12p). Consequently, as shown in FIG. 1, there is produced a finished seat cushion (12) having the container (16) mounted thereon.

Form the description above, in accordance with the present invention, it is to be appreciated that the following advantages and effects are attained:

(i) The upper cover section (12aU) of the trim cover assembly (12a) as well as the assembled container (16) mounted therein are first provided independently of the foam padding (12p) and then attached on the upper surface of that foam padding (12p), with the container body (16b) fitted in the recession (12p1) formed in the foam padding (12p). Naturally, when the foam padding (12p) is resiliently depressed due to an externally applied load, the surface of the upper cover section (12aU) is lowered with such depression of foam padding (12p), which in turn forcibly pulls down a localized area (12c) of the upper cover section (12aU) which surrounds the container lid element (16a). However, in the present invention, any clearance or opening, in which the finger(s) of a user may be inserted or caught, is not created between such trim cover assembly's localized area (12c) and the container lid element's lateral wall region (16a1B).

(ii) The reasons for the above-stated avoidance of a clearance or opening are:

(a) As shown in FIG. 7, the vertically protrudent end portion (16b1') of the container body (16b) projects upwardly along the lateral wall region (16a1B) of the container lid element (16a) to a level at which the outer surface of the upper cover section's localized area (12c), overlaying the top end of the vertically protrudent end portion (16b1'), is situated substantially flush with the outer surface of the upper wall region (16a1A) of the container lid element (16a). With this arrangement, along the boundary between the container lid element's lateral wall region (16b1B) and the upper cover section's localized area (12c), an extremely small recession is left, which is not any opening or clearance in which the user's finger will be inserted or caught therein. Further, even when the localized area (12c) is pulled outwardly and downwardly due to the depression of the foam padding (12p), such extremely small recession is neither widened nor developed into any clearance or opening of a dimension in which the user's finger(s) can be inserted or caught; and (b) A whole of the peripheral end area or margin (12c') associated with the upper cover section (12aU) is sandwiched neatly and tightly between the container lid element's lateral wall region (16a1B) and the container body's flange and protrudent end portions (16b1) (16b1'), and, under such sandwiched state, the container mounting hole (12h) as well as the peripheral end area (12c') surrounding that container mounting hole (12h) are entirely disposed independently of the foam padding (12p). Thus, depression or downward deformation of the foam padding (12p) will in no way influence the boundary between the upper cover section's localized area (12c) and the container lid element's lateral wall region (16a1B). Further, even any great outward pulling force caused in the upper cover section (12aU) due to such depression of foam padding (12p) is blocked at the vertically protrudent end portion (16b1'), thereby preventing creation of any clearance or opening in and along the boundary between the lateral wall region (16a1B) and the localized area (12c) of the upper cover section (12aU).

Because of the foregoing reasons (a) and (b), even if the upper cover section (12aU) is lowered or deformed downwardly, the user's finger(s) will not be caught in between the container lid element (16a) and the upper cover section's localized area (12c) surrounding that container lid element (16a). In particular, the vertically protrudent end portion (16b1') associated with the flange portion (16b1) also serves as a guard to prevent the user's finger(s) from being inserted or caught in between the container lid element (16a) and the localized area (12c), hence eliminating any necessity for providing any other separate guard element.

(iii) In the present invention, therefore, no finger guard element is required, and it is not required to secure the container body portion (16b) to a seat frame, as opposed to the previously stated prior art.

(iv) As shown in FIG. 3, both of the flange and protrudent end portions (16b1) (16b1') underlie the upper cover section (12aU) of the trim cover assembly (12a) and are further placed in the second recession (12p1B) so as not to project thereabove. This arrangement aesthetically improves the outer appearance of the upper cover section (12aU).

(v) As seen in FIG. 3, a whole of the top wall region (16a1A) of the container lid element (16a) is, at the reverse or inward surface thereof, supported on and by the upper end portion(16b4), which avoids a creation of a projected or uneven portion in the localized area (12c) of the upper cover section (12aU), the upper cover section (12aU) surrounding the container lid element (16a). That is, no substantive damage is given to the top wall region (16a1A), and therefore, upon no load being applied, the top wall region (16a1A) immediately and resiliently returns to its normal original shape.

(vi) In accordance with the assembly process of the present invention, the connecting pieces (16d1) of the container lid element (16a) are simply inserted respectively through the connecting slits (S1) and (S2) which are respectively associated with the upper end portion (16b4) of the container body (16b). Thus, a downward great load or pressure applied to such top wall region (16a1A) is directly imparted to and dispersed in that upper end portion (16b4), so that, in that case, the top wall region (16a1A) is resiliently deformed to a certain degree, but prevented from breaking, thanks to the load absorption of the upper section (12aU) and the container body (16b), followed by simply putting together the container lid element (16a) and container body (16b) at one time. Shortly thereafter, the connecting pieces (16d1) are subjected to melting or fusing to form the flattened stopper portions (16d2) at the respective free ends thereof, at one time. In other words, all those steps are effected along one line of assembly and coaxially of all the cover lid element (16a), container mounting hole (12h) and container body (16b). With such one line of coaxial assembly, the container (16) can quickly be mounted to the upper cover section (12aU) with much ease, while at the same time, the peripheral end area or margin (12c') surrounding the container mounting hole (12h) is automatically sandwiched and concealed between the container lid element (16a) and container body (16b). Therefore, no complicated troublesome steps are required and no separate connecting part is required, either, as opposed to the previously stated prior art. In other words, in the present invention, a simple provision of the container lid element (16a) and the container body (16b), and a simple formation of the slits (S2) along the peripheral end area or margin (12c') of the upper cover section (12aU) are all that is required, thus minimizing the number of required parts and attaining simplified and low-cost steps of assembly. Further, all the steps in the present invention can easily be effected in a fully automated manner, thereby realizing a rapid and high efficient assembly of a vehicle seat with container(s) thereon.

While having described the present invention thus far, it should be understood that any modification, addition and replacement may be physically applied thereto without departing from the scopes of the appended claims. For example, the container (16) may be disposed in any localized area of the upper surface (at the upper cover section (12aU) of the seat cushion (12), and also may be mounted to an upper surface of armrest (14a). The present invention is applicable not only to a front seat (e.g. driver's seat or assistant seat), but also to a rear seat and/or a second rear seat, or a side seat. It is be noted that the vehicle seat defined in the present invention is not limited to an automotive seat, but includes various kinds of seats used in a train, airplane, vessel or the like.

What is claimed is:

1. A structure of container mounted to a vehicle seat, said container being configured to receive at least one small article therein,
wherein said vehicle seat includes:
an upper surface;
a foam padding having an upper surface defined therein in correspondence with said upper surface of the vehicle seat and a recession formed in said upper surface of said foam padding; and
a trim cover assembly covering said foam padding, said trim cover assembly including an upper cover section configured to cover said upper surface of said foam padding,
wherein said container comprises:
a container body having: a main body portion; a flange portion defined integral with said main body portion so as to extend outwardly and peripherally of the main body portion, said flange portion having a top surface and a reverse surface opposite to said top surface; and a first plurality of connecting slits formed in and along said flange portion;
a container lid element including: a top wall region; an openable lid region defined in said top wall region; and a lateral wall region extending vertically from and peripherally of said top wall region and terminating in an end extending along the lateral wall region;
said lateral wall region having: an outer surface defined outwardly of the container lid element; and an inward surface defined inwardly of the container lid element; and a flat surface defined in said end of the lateral wall region so as to lie between said outer surface of the lateral wall region and a predetermined point in said end of the lateral wall region and extend along said end; and
a plurality of connecting pieces formed in and along said end of said lateral wall region in correspondence with said first plurality of connecting slits, respectively, so as to project from said end and lie between said predetermined point in said end and said inward surface of said lateral wall region, said plurality of connecting pieces therefore projecting from said end in an offset manner with reference to said outer surface of the lateral wall region, with said flat surface being situated between said plurality of connecting pieces and said outer surface of the lateral wall region, in said end,
wherein said upper cover section includes: a container mounting hole formed therein; and a peripheral end area defined about said container mounting hole,
wherein a second plurality of connecting slits are formed in and along said peripheral end area so as to surround said container mounting hole, said second plurality of connecting slits being disposed in correspondence with said plurality of connecting pieces, respectively,
wherein said lateral wall region of said container lid element is juxtaposed upon said top surface of said flange portion of said container body,
wherein said peripheral end area of said upper cover section is sandwiched between said top surface of said flange portion and said flat surface of said lateral wall region of said container lid element,
wherein said plurality of connecting pieces pass through said second plurality of connecting slits of said upper cover section, respectively, and also pass through said first plurality of connecting slits formed in said flange portion of said container body, respectively, whereupon said plurality of connecting pieces project from said reverse surface of said flange portion, wherein each of said plurality of connecting pieces has a flattened stopper portion formed at the free end thereof by melting or fusing, said flattened stopper portion being in close contact with said reverse surface of said flange portion, thereby preventing removal of said container lid element from said container body, and wherein said trim cover assembly is securely attached to said foam padding, such that said upper cover section thereof covers said upper surface of said foam padding, with said main body portion of said container body being inserted in said recession of the foam padding.

2. The structure as claimed in claim 1, wherein said flange portion has a vertically protrudent end portion formed integrally therewith so as to extend vertically from and peripherally of the flange portion, wherein said lateral wall region of said container lid element is surrounded by said vertically protrudent end portion, and wherein said peripheral end area of said upper cover section is sandwiched between said lateral wall region and said vertically protrudent end portion as well as between said top surface of said flange portion and said flat surface of said lateral wall region of said container lid element.

3. The structure as claimed in claim 1, wherein said openable region comprises a pair of spaced-apart resilient lid portions, and wherein said container lid element includes an opened region formed therein by cutting out a predetermined area thereof, excepting said pair of spaced-apart resilient lid portions.

4. The structure as claimed in claim 1, wherein said container body and said container lid element are each formed from a resilient material, said resilient material including a soft synthetic resin material.

5. The structure as claimed in claim 1,
   wherein said top wall portion of said container lid element has: an outer surface facing outwardly thereof; and a reverse surface opposite to said outer surface, said reverse surface facing toward said container body, and
   wherein said main body portion of said container body comprises: a substantially annular lateral wall portion with which said flange portion is foamed integrally so as to extend outwardly and peripherally thereof; and an end portion defined integrally with said substantially annular lateral wall portion, and wherein said end portion extends vertically from a point in said substantially annular lateral wall portion where said flange portion lies and terminates at a level where the end portion is situated adjacent to or in contact with said reverse surface of said top wall portion of said container lid element.

6. A method for mounting a container to an upper surface of a vehicle seat, wherein said container is configured to receive at least one small article therein, the container comprising:
   (a) a container body having: a main body portion; a flange portion extending outwardly and peripherally of said main body portion, said flange portion having a top surface and a reverse surface opposite to said top surface; and a first plurality of connecting slits formed in and along said flange portion; and
   (b) a container lid element including; a top wall region; and a lateral wall region extending vertically from and peripherally of said top wall region and terminating in an end extending along the lateral wall region; said lateral wall region having: an outer surface defined outwardly of the container lid element; and an inward surface defined inwardly of the container lid element; and a flat surface defined in said end of the lateral wall region so as to lie between said outer surface of the lateral wall region and a predetermined point in said end of the lateral wall region and extend along said end; and a plurality of connecting pieces formed in and along said end of said lateral wall region in correspondence with said first plurality of connecting slits, respectively, so as to project from said end and lie between said predetermined point in said end and said inward surface of said lateral wall region, said plurality of connecting pieces therefore projecting from said end in an offset manner with reference to said outer surface of the lateral wall region, with said flat surface being situated between said plurality of connecting pieces and said outer surface of the lateral wall region, in said end, said method comprising the steps of:
   providing a foam padding which includes: an upper surface defined therein in correspondence with said upper surface of said vehicle seat; and a recession formed in said upper surface of said foam padding,
   providing a trim cover assembly for covering said foam padding, said trim cover assembly including an upper cover section adapted to cover said upper surface of said foam padding, wherein said upper cover section includes: a container mounting hole formed therein; a peripheral end area defined about said container mounting hole; and a second plurality of connecting slits formed in and along said peripheral end area so as to surround said container mounting hole, said second plurality of connecting slits being disposed in correspondence with said plurality of connecting pieces, respectively,
   placing said upper cover section upon said container lid element, while causing said plurality of connecting pieces to pass respectively through said second plurality of connecting slits,
   attaching said container lid element with said upper cover section thus placed thereon to said container body, while causing said plurality of connecting pieces to pass respectively through said first plurality of connecting slits and bringing both said lateral wall region and said flat surface of said container lid element into contact with said top surface of said flange portion of said container body, so that said peripheral end area of said upper cover section is sandwiched between said top surface of said flange portion and said flat surface of said lateral wall region of said container lid element, and free ends respectively of said plurality of connecting pieces project outwardly from said reverse surface of said flange portion,
   melting or fusing each of said free ends respectively of said plurality of connecting pieces to form a flattened stopper portion therein, such that said flattened stopper portion is in close contact with said reverse surface of said flange portion, thereby preventing removal of said container lid element from said container body, whereupon a resultant assembled state of said container is securely mounted to said upper cover section, and
   thereafter, attaching said upper cover section, to which said resultant container has been thus mounted, upon said upper surface of said foam padding, while simultaneously inserting said main body portion of said resultant container in said recession of the foam padding.

* * * * *